United States Patent [19]

Andrade et al.

[11] Patent Number: 4,508,606

[45] Date of Patent: Apr. 2, 1985

[54] PROCESS FOR TREATING POLYMER SURFACES TO REDUCE THEIR FRICTION RESISTANCE CHARACTERISTICS WHEN IN CONTACT WITH NON-POLAR LIQUID, AND RESULTING PRODUCTS

[76] Inventors: Joseph D. Andrade, 2059 Merrill Eng. Bldg. Univ. of Utah, Salt Lake City, Utah 84112; Philip M. Triolo, 1164 E. South Temple, Salt Lake City, Utah 84012; Lee M. Smith, Bldg, 518 Dept, Bio Eng. Univ. of Utah; Frank J. Miller, 1C 402 Med. Center Univ. of Utah, both of Salt Lake City, Utah 84112

[21] Appl. No.: 495,209

[22] Filed: May 16, 1983

Related U.S. Application Data

[63] Continuation-in-part of Ser. No. 239,089, Feb. 27, 1983, abandoned.

[51] Int. Cl.$^3$ ................................................ C07C 3/24
[52] U.S. Cl. .................................... 204/169; 204/165; 204/168
[58] Field of Search ...................... 204/165, 168, 169

[56] References Cited

U.S. PATENT DOCUMENTS

| | | | |
|---|---|---|---|
| 3,057,792 | 10/1962 | Frohlich | 204/165 |
| 3,255,099 | 6/1966 | Wolinski | 204/169 |
| 3,309,299 | 3/1967 | Mantell | 204/165 |
| 3,526,583 | 9/1970 | Hayward | 204/165 |
| 3,677,877 | 7/1972 | Metevia et al. | 204/165 X |
| 4,055,378 | 10/1977 | Feneberg | 204/165 |
| 4,297,187 | 10/1981 | Deguchi | 204/165 |
| 4,310,564 | 1/1982 | Imada et al. | 427/40 |
| 4,311,828 | 1/1982 | Imada | 204/165 |

*Primary Examiner*—John F. Niebling
*Attorney, Agent, or Firm*—Thorpe, North and Western

[57] ABSTRACT

Surfaces of hydrophobic polymers are treated to reduce their friction resistance characteristics when in contact with an aqueous environment by exposing the surfaces to an oxidation treatment, preferably by use of radio frequency glow discharge. This oxidation is followed by exposure to atmospheric air, until there is a substantial reduction in the air-water contact angle of the surfaces. The reduced friction resistance characteristics are important in aqueous applications where there is movement between the surfaces of two polymeric materials, such as in double slideable catheters and similar medical products. This process also provides lower coefficients of friction for general polymeric products in contact with water and aqueous solutions.

12 Claims, No Drawings

PROCESS FOR TREATING POLYMER SURFACES TO REDUCE THEIR FRICTION RESISTANCE CHARACTERISTICS WHEN IN CONTACT WITH NON-POLAR LIQUID, AND RESULTING PRODUCTS

This application is a continuation-in-part application of our application Ser. No. 239,089, filed Feb. 27, 1983 now abandoned.

BACKGROUND OF THE INVENTION

Synthetic polymers have properties which make them suitable for many applications in industry. Because of their properties, such as elasticity, light weight and compatibility with living tissue, they are particularly useful in the preparation of products in the medical field, such as artificial valves, veins, tubes, catheters, and the like.

In many applications, and particularly those in the medical field, the friction characteristics of the polymer product are important as in many cases the polymer product must move with respect to some other surface which may include another polymer, biological or other solid or semi-solid surface. This is particularly true in the case of double slideable catheters or guided catheters wherein one tube or catheter must move within the lumen of a second outer tube or catheter or wherein the outer tube or catheter must move over an inner tube or rod, including metal or polymer guides.

Catheters prepared from synthetic polymers have gained widespread acceptance by the medical profession. Catheters are used frequently in such routine procedures as the delivery of intravenous fluids and the removeal of urine from compromised patients. Cardiovascular dynamics are increasingly monitored utilizing catheter systems. Catheters are in use and being developed for chemical sensing using a variety of chemical transducers. Such catheters provide the pathway by which heretofore inaccesible body areas can be reached for both diagnostic and therapeutic procedures, thereby reducing the need for surgery.

As catheterization techniques have become more complicated, demands placed on the performance of the catheter have increased proportionately. Whereas catheters were once little more than straight plastic tubes, they are now available in a variety of configurations. Some are highly specialized with unique apertures, appendages, and tapers, and may even employ fiberoptics.

Recently, double catheter systems have been employed to deliver drugs or occlude blood flow to specific organs or tissues. These systems usually employ a rigid outer catheter and a buoyant, flexible inner catheter than can freely float in the blood stream.

The paths that these catheters must take through the body are often long and tortuous. For example, in order to access the cranial vessels, catheterization may be initiated at the femoral artery. There is a great deal of surface contact between the two catheters and a great deal of friction can, and often does, result. The frictional drag encountered by the inner catheter as it slides through the outer catheter makes its placement difficult and sometimes impossible.

Various methods have been proposed in the past for reducing the friction resistance characteristics of polymer and other surfaces, such as the addition of lubricants, polishing of the surface, etc., but none has been entirely satisfactory, particularly for medical products, such as double slideable catheters. In some cases, the treatment has had a detrimental effect on the movement of the inner catheter and in some cases the treatment has been only temporary or has had a detrimental reaction with body materials in contact with the catheter.

Improved technics for treatment of polymer surfaces to reduce friction resistance are disclosed in an article by Triolo et al published in Journal of Biomedical Materials Research, Vol. 17, 129–147 and 149–165 (1983).

It is an object of the invention, therefore, to provide a new and efficient process for reducing friction resistance characteristics of polymer surfaces when in contact with non-polar liquids, such as water, as in the case of medical products, such as catheters, where the increased movability and water wetability are greatly needed. It is a further object to provide treated surfaces which have good biocompatibility with body materials, such as blood plasma and the like.

DESCRIPTION OF THE INVENTION

With this background in mind, the present invention provides a process which meets the aforestated objectives and effects a significant reduction in the friction resistance characteristics of polymer surfaces when in contact with non-polar liquids, such as water. Specifically, the invention provides a process for treating surfaces of hydrophobic polymers to reduce their friction resistance characteristics when in contact with a non-polar liquid such as water, sea water, saline solutions, cell culture media, blood plasma and serum, etc. which comprises exposing the surface of the polymer to an oxidation treatment under controlled conditions, and preferably by use of radio frequency glow discharge in an inert atmosphere to activate the surface followed by exposure to atmospheric air to effect the oxidation and bring about a reduction in the air-water contact angle of the surface to a value below 50°, and preferably in the range of 0° to 30°, and an increase in the water wetability of the surface.

It has been found that the friction resistance characteristics of the polymer surface treated as above is significantly reduced when the surface is in the presence of a non-polar liquid, such as a film of water, wherein the said liquid can be bound or adhered to the treated surface and thus provide improved mobility over other polymer surfaces or surfaces made from other solid materials.

Particularly then the present invention provides a process for reducing friction resistance in those systems wherein a hydrophobic polymer in contact with a layer of a non-polar liquid moves over the said non-polar liquid while it rests on another solid surface. This is accomplished by using as the hydrophobic polymer a hydrophobic polymer which has been, at least on the surface in contact with the non-polar liquid, subject to an oxidation treatment as noted above to reduce the air-water contact angle of the surface below 50°.

While the reason for the improved reduction in friction characteristics has not been fully established, it is believed that the controlled oxidation affects formation of a substantial amount of oxygen-containing groups, such as hydroxyl groups, carboxyl groups, ester groups and the like, which improve the water wetability without significantly changing the other desired properties of the polymer surface. It is believed that these newly formed groups permit bonding of a thin film of liquid to the surface of the polymer, such as by hydrogen bonding and related dipole interaction processes. The bound or entrapped liquid layer serves as a lubricating film which greatly reduces the friction resistance between that treated surface and other surfaces in contact therewith in a liquid environment.

This reduction in the friction resistance characteristics is surprising and unexpected because such an improvement is not seen in the dry state but only when in contact with the said liquid. In fact, it will often be increased over the friction characteristics of the same two unmodified hydrophobic state in air. Thus, increasing the polarity of the surface increases the friction resistance in air. The reason for the increased friction in air of the surface-modified polymer material appears to be that now the polar hydrogen bonding characteristic intrinsic to the surface groups can bind across the interface to the respective groups on the other material surface, thus producing a strong adhesion and a high friction.

Thus, prior art references showing the oxidation of polymer surfaces with the consequential increase in friction properties in air, would lead one away from rather than towards the present invention.

The treatment of the polymer surfaces to effect the oxidation treatment can be accomplished by a variety of methods. It may be accomplished, for example, by use of oxidizing acids and related chemical reagents resulting in the chemical bond breakage followed by reaction with oxygen and other discharge processes utilizing excited gases and related species.

A preferred treatment includes the use of radio frequency glow discharge in an inert atmosphere, such as helium, neon and/or argon, followed by exposure to atmospheric air. An apparatus for creating the electrical discharge of the type that can be used in the process of the invention is dedescribed in U.S. Pat. No. 3,005,762 and in J. R. Hollohan and A. T. Bell, ed., Techniques and Applications of Plasma Chemistry, J. Wiley, 1974.

The parameters for the radio frequency glow discharge treatment include the RF coil configuration, gas composition, pressure, temperature and power supply characteristics as disclosed in Hollohan and Bell. Each can be varied as needed to obtain the desired results of the present invention.

Commercial apparatus suitable for producing the radio frequency glow discharge include the Plasmod product (Tegal Corp.). In the operation of the process of the invention using this apparatus, the polymer to be treated is placed in the chamber and the chamber is back filled and evacuated several times to remove atmospheric gases and back filled with an inert gas, such as helium, neon or argon, to a pressure preferably between 5 and 200 microns of mercury. The radio frequency glow discharge power will generally range from about 0.1 to 1000 watts and preferably between 5 and 500 watts. Treatment time generally varies from about 5 to 10,000 seconds and more preferably from 5 to 500 seconds. Too short a time will not give the desired results while too long a time may result in destruction of some of the other desired properties of the plastic material being treated, for example excessive treatment can result in surface roughening and increased friction.

As noted, the parameters are controlled so as to bring about the desired change in the air-water contact angle of the treated surface. The air-water contact angle should be reduced below 50°. In general, the greater the decrease in the angle from that of the unmodified surface, the better is the surface treatment in terms of the improved wetability and decrease in friction resistance characteristics in the presence of water. A description of the method used for determining the air-water contact angles may be found in standard textbooks of surface chemistry, such as A. U. Adamson, Physical Chemistry of Surfaces.

In addition to the index of air-water contact angle, X-ray photoelectron spectroscopy can be used to measure the number and types of hydrophilic functional groups on the resulting treated surface and thus verify the oxidation of the resulting product. This technique is used in the examples at the end of the specification. The resulting products preferably contain from 1% to 70% oxygen.

When using the radio frequency glow discharge apparatus as noted above, it is generally preferred to maintain the temperature in the reaction chamber at about ambient temperature.

The process of the invention can be used in a batch, semicontinuous or continuous manner depending upon the type of material and product desired. The process may be performed in a continuous manner, as in a production line environment, particularly if only the outer surface of the polymer is to be modified, as in the outer surface of the inner tube of the double catheter described above. The thickness of the polymer surface to be treated is not critical as long as the surface treatment results in the formation of the hydrophilic surface which binds a film of water and thus provides the lubricated surface desired.

The process of the invention can be used for the treatment of any hydrophobic polymer. Hydrophobic polymers are defined as those polymers whose surface properties are generally considered to be hydrophobic in character and whose surfaces are non-wettable with water. Surfaces whose air-water contact angle is greater than 50° are considered hydrophobic for the purpose of this invention.

The polymers to be used in the process of the invention may be any of the natural or synthetic polymeric materials meeting the above definition. They may be high molecular weight or low molecular weight; rigid, soft, or elastomeric; transparent or opaque; and may contain fillers, plasticizers, stabilizers, and many other types of additives.

The polymers may be of any chemical structure and include, among others, homopolymers, copolymers, dipolymers, tripolymers, graft copolymers, and other types of polymeric products including blends and mixtures of polymers. In many cases, the polymers will be of the thermoplastic type but thermosetting types of polymers can also be used.

The polymers may be obtained by any type of polymerization technique including, among others, addition polymerization, condensation polymerization and the like, which may include suspension and emulsion type polymerization systems as well as bulk or solvent polymerization. Polymerization catalysts employed may be of any type. In case of the products obtained by cross-linking, they may be treated with any known cross-linking materials, such as peroxides, polyamines, polycarboxylic acids, metal salts, and the like.

Examples of polymers to be used in the process of the invention include, among others, those obtained by addition polymerization of unsaturated, and preferably ethylenically unsaturated, monomers such as methyl methacrylate, butyl acrylate, amyl methacrylate, allyl acetate, allyl octoate, diallyl adipate, vinyl chloride, vinyl bromide, vinylidine chloride, styrene, methyl styrene, chlorostyrene, methoxystyrene, vinyl pyrolidone, vinyl pyridine, methyl allyl phthalate, divinyl succinate, methallyl octyl phthalate, allyl chlorobutyl succinate, and the like, and copolymers, interpolymers and block polymers thereof with each other or other unsaturated monomers.

Other examples of polymers to be used in the process of the invention include those obtained by polymerizing olefins and polyolefins and copolymers thereof with each other or other unsaturated monomers. Of special interest are the block polymers obtained by formation of a block of polystyrene attached to a block of polybutadiene attached to a block of polystyrene, or in other arrangements of blocks to obtain the desired properties. Particularly preferred are block polymers of the structure:

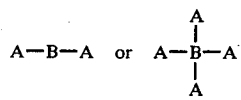

wherein A is a polymer segment to add rigidity to the polymer and B is a polymeric segment to add the desired flexibility.

Other examples of polymers to be used in the process of the invention include the silicone polymers and particularly those having repeating units of:

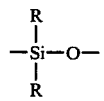

wherein R may be a saturated or unsaturated hydrocarbon or substituted hydrocarbon, such as methyl, butyl, amyl, phenyl, vinyl, chloromethyl, bromobutyl, cyclohexyl, cyclopentadienyl, and the like. Particularly preferred are the poly(dialkyl siloxanes) and the poly(diaryl siloxanes), such as poly(dimethyl siloxane), poly(butyl siloxane) and poly(phenyl siloxane) and cross-linked products thereof, such as those obtained by cross-linking the polymer with water or agents, such as methyl triacetoxy silane.

Other examples of the polymers to be used in the process of the invention include, among others, those obtained by halogenating the above-described polymers, and preferably the chlorinated and fluorinated polymers such as the halogenated ethylene polymers, the fluorinated ethylene-propylene copolymers, fluorinated propylene-butylene copolymers, fluorinated propylene-styrene copolymers, and the like.

Still other examples include the condensation type polymers, such as the polyesters obtained by reacting polyhydric alcohols with polycarboxylic acids, the polyamides obtained by reacting polyamines with polycarboxylic acids, the polyurethanes, polycarbonates, and the like, and mixtures thereof.

Preferred polymers to be used in the process of the invention include among others the polymers obtained by polymerizing mono or polyepoxides.

Particularly preferred polymers to be used in the process include the polyolefins, polydiolefins, polyamides, polyesters, polyurethanes, silicone-based polymers, polystyrene, polyfluorohydrocarbons, polyvinyl chloride, poly(alkyl acrylates), poly(alkyl methacrylates), polycarbonates, styrene-butadiene-styrene block polymers, styrene-ethylene block polymers, styrene-butylene block polymers, and the like, and mixtures and blends thereof.

Of special interest are the polymers of olefins and diolefins containing up to 6 carbon atoms, polymers of vinyl monomers containing

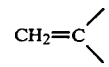

and up to 8 carbon atoms, polymers of vinyl halides, fluorinated hydrocarbon polymers wherein the basic monomer contains up to 6 carbon atoms, polymers of styrene and alkyl-substituted styrenes wherein the alkyl group contains up to 4 carbon atoms, silicone polymers containing units of

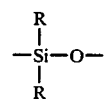

wherein R is a hydrocarbon containing up to 6 carbon atoms, polyesters of polyhydric alcohols and polycarboxylic acids containing up to 10 carbon atoms each, polyamides of polyamines and polycarboxylic acids containing up to 8 carbon atoms each, and the polycarbonates wherein the repeating units contain no more than 8 carbon atoms each.

The polymers treated by the process of the invention may be used for a variety of purposes unique to a non-polar liquid environment. They are particularly useful in the preparation of products wherein one surface in contact with a non-polar liquid is to be moved over the surface of another polymer or solid surface. As noted above, the treated polymers are particularly useful in the preparation of products in the medical field where the reduced friction is of great advantage. They are especially valuable in the preparation of catheters. The expression "catheter" as used herein includds all types of medico-surgical tubes used in modern medical and surgical practice and rod-like guides used in the delivery of such tubes. They may have a variety of configurations with different apertures, appendages, tapers and the like. Catheters include feeding tubes, oxygen-connecting tubes, anesthesia administration tubes, duodenal tubes, reactal tubes, sump drain tubes, suction catheters, balloons for cariac-assist and related applications, and coaxial or double sideable catheters having a smaller tube passing through a larger outer tube. Preferably the outer tube is made from a semi-rigid polymeric material while the inner tube is prepared from a soft elastomeric material. In operation, a saline solution or other aqueous solution is constantly injected into the space between these two tubes and an inflatable balloon is usually attached to the inner catheter to aid its movement in the body. While it is preferred to have both surfaces in contact with each other treated according to the process of the invention, satisfactory results are obtained when only one of the surfaces of the polymeric material have been so treated.

The polymeric material may first be treated according to the process of the invention and the above-described products prepared therefrom, or the products, such as the catheters, may first be prepared and then the product treated according to the process of the invention, satisfactory results are obtained when only one of the surfaces of the polymeric material have been so treated.

The polymeric material may first be treated according to the process of the invention and the above-described products prepared therefrom, or the products, such as the catheters, may first be prepared and then the product treated according to the process of the invention. In the latter case, the treatment may be directed to the product as a whole or only to special parts, such as the inside of the tubes. In the case of the catheters, the treatment, such as the radio frequency glow discharge, may be directed through the center of the tube to effect only the inner surface of the tube.

To illustrate the process of the invention, the following examples are given. It should be understood, however, that they are given only in the way of illustration and in no way limit the scope of the invention. The examples particularly demonstrate the effectiveness of the process of the invention in reducing friction characteristics when in contact with water.

EXAMPLE I

A series of five different polymers were treated according to the process of the invention. Samples of the polymers 1×3 inches in size were placed in the chamber of a Plasmod apparatus manufactured by Tegal Corp. The chamber was back filled and evacuated several times to remove atmospheric gases and back filled with helium to a pressure of 200 microns of mercury. The power delivered to the plasma was 15 watts over the period indicated in the table below. The resulting products were hydrated overnight in distilled water and dried and subsequently surface characterized by contact angle measurements and X-ray photoelectron spectroscopy. The results are shown in the table below as to the contact angle after air storage times of one day, one week, one month and three months, and for a period of treatment of 5, 30, 120 and 300 seconds.

In the table, the polymers used were:
PE—polyethylene of low density and additive free
PS—polystyrene having a molecular weight of 84,600 (Mn) and 321,000 (Mw) weight average
FEP—fluorinated ethylene-propylene copolymer from DuPont, Teflon FEP Type A
PVC—poly(vinyl chloride) having a molecular weight of 37,400 (Mw) and 83,500 (Mn)
SR—poly(dimethyl siloxane) having a molecular weight of 23,000 (Mn) before using. Dow Corning NRV Silastic Sheeting (10 mils) was used for the friction studies
Mw—weight average, molecular weight
Mn—number average, molecular weight

| | | Air-Water Contact Angle (θ) (n) is Number of Measurements | | | | | | | |
|---|---|---|---|---|---|---|---|---|---|
| | RFGD Treatment | One Day | | One Week | | One Month | | Three Months | |
| Polymer | Time (sec) | θ(°) ± | SD (n) | θ(°) ± | SD (n) | θ(°) ± | SD (n) | θ(°) ± | SD (n) |
| PE | 0 | 87.1 | 2.4(27) | 89.4 | 3.1(28) | 86.2 | 6.8(30) | 86.2 | 5.7(30) |
| | 5 | 72.6 | 4.5(29) | 70.6 | 8.2(29) | 66.3 | 7.4(30) | 52.0 | 5.5(29) |
| | 30 | 42.1 | 9.0(30) | 61.6 | 4.6(29) | 59.5 | 5.8(28) | 46.6 | 5.8(30) |
| | 120 | 53.8 | 3.7(29) | 44.0 | 9.9(28) | 44.9 | 4.8(28) | 45.3 | 4.5(30) |
| | 300 | 42.8 | 3.3(29) | 46.3 | 11.3(28) | 45.3 | 5.8(25) | 37.6 | 0.3(27) |
| PS | 0 | 86.4 | 1.4(21) | 85.1 | 3.7(30) | 82.4 | 2.3(30) | 33.0 | 5.2(28) |
| | 5 | 19.2 | 10.3(30) | 20.5 | 6.9(30) | 39.8 | 1.3(29) | 22.7 | 3.0(15) |
| | 30 | 27.7 | 4.8(28) | 32.3 | 4.5(30) | 32.8 | 4.5(29) | 21.7 | 5.3(15) |
| | 120 | 31.9 | 5.5(29) | 32.0 | 3.5(28) | 27.9 | 3.3(29) | 17.1 | 5.0(13) |
| | 300 | 25.8 | 7.3(30) | 26.6 | 4.8(29) | 25.6 | 5.2(38) | 18.8 | 5.2(15) |
| FEP | 0 | 99.8 | 3.9(29) | 100.9 | 9.4(27) | 92.9 | 1.1(30) | 95.6 | 5.1(29) |
| | 5 | 51.0 | 6.6(29) | 58.4 | 9.2(29) | 42.7 | 3.0(27) | 53.2 | 5.2(15) |
| | 30 | 31.3 | 10.7(27) | 40.0 | 5.5(30) | 41.7 | 5.4(29) | 47.6 | 9.5(15) |
| | 120 | 24.0 | 7.9(29) | 41.0 | 3.6(29) | 29.8 | 5.7(28) | 39.6 | 5.7(15) |
| | 300 | <10.0 | —(30) | 18.1 | 11.7(30) | 24.9 | 3.8(28) | 31.9 | 7.2(15) |
| PVC | 0 | 75.2 | 2.2(29) | 78.5 | 3.5(27) | 78.7 | 5.6(15) | 79.3 | 5.2(28) |
| | 5 | 29.5 | 8.6(28) | 22.4 | 5.8(27) | 28.0 | 7.2(30) | 22.2 | 5.5(26) |
| | 30 | 28.6 | 12.2(29) | 15.5 | 9.5(15) | 9.5 | 5.3(29) | 15.5 | 5.9(26) |
| | 120 | 19.6 | 11.0(30) | 8.4 | 7.5(29) | 10.0 | —(30) | 21.3 | 5.8(27) |
| | 300 | 25.1 | 5.4(29) | 10.0 | —(30) | 10.0 | —(30) | 12.5 | 1.0(15) |
| SR | 0 | 103.5 | 1.9(25) | 107.4 | 1.3(28) | 30.8 | 4.9(23) | 35.1 | 5.4(30) |
| | 5 | 79.2 | 17.8(27) | 68.4 | 19.8(30) | 24.5 | 6.4(26) | 26.1 | 5.6(30) |
| | 30 | 30.0 | 19.0(30) | 23.5 | 6.6(22) | 13.9 | 5.8(30) | 20.4 | 5.6(28) |
| | 120 | 8.8 | 5.4(28) | 12.2 | 6.3(30) | 23.2 | 5.1(19) | 20.0 | 5.4(29) |
| | 300 | <10.0 | —(30) | 10.5 | 5.7(30) | 20.2 | 11.2(30) | 17.7 | 5.0(29) |

The X-ray photoelectron spectroscopy data for the above-treated polymers are presented in the table below. The percent oxygen indicates the extent of the oxidation of the polymer surfaces.

| Polymer | Composition | Control | Radio Frequency Glow Discharge Treatment Time (seconds) | | |
|---|---|---|---|---|---|
| | | | 15 | 30 | 120 | 300 |
| PE | % oxygen | 0.00 | 3.07 | 10.20 | 11.80 | 22.27 |
| | % carbon | 100.00 | 91.93 | 38.10 | 88.20 | 59.90 |
| | % silicon | 0.00 | 0.00 | 1.70 | 0.00 | 0.32 |
| | O:total | 0.00 | 0.09 | 0.11 | 0.13 | 1.29 |
| PS | % oxygen | 0.00 | 0.98 | 5.89 | 12.60 | 5.17 |
| | % carbon | 100.00 | 89.02 | 94.11 | 87.40 | 18.53 |
| | % nitrogen | 0.00 | 0.00 | <0.50 | 0.50 | 5.31 |
| | O:total | 0.00 | 0.12 | 0.06 | 0.14 | 1.09 |
| FEP | % oxygen | 0.00 | 1.43 | 0.93 | 3.19 | 1.56 |
| | % carbon | 33.87 | 27.23 | 26.76 | 31.31 | 39.75 |
| | % fluorine | 66.13 | 71.34 | 72.31 | 64.80 | 51.50 |
| | % nitrogen | 0.00 | 0.00 | <0.50 | 0.70 | 0.34 |
| | % silicon | 0.00 | 0.00 | 0.00 | 0.00 | 0.35 |
| | O:total | 0.00 | 0.01 | 0.01 | 0.03 | 1.07 |
| PVC | % oxygen | 4.11 | 14.77 | 16.38 | 17.26 | 5.91 |
| | % carbon | 80.57 | 73.66 | 79.31 | 78.80 | 52.41 |
| | % chlorine | 15.32 | 11.57 | 4.32 | 3.94 | .68 |
| | % nitrogen | 0.00 | 1.00 | 0.50 | 0.00 | <0.50 |
| | O:total | 0.04 | 0.17 | 0.20 | 0.21 | 1.19 |
| SR | % oxygen | 26.17 | 39.34 | 51.69 | 63.64 | 55.56 |
| | % carbon | 50.79 | 35.53 | 21.30 | 12.56 | 1.97 |

| Polymer | Composition | Control | Radio Frequency Glow Discharge Treatment Time (seconds) | | | |
|---|---|---|---|---|---|---|
| | | | 05 | 30 | 120 | 300 |
| | % silicon | 23.03 | 25.13 | 25.47 | 23.80 | 27.06 |
| | % fluorine | 0.00 | <0.50 | 1.53 | <0.50 | 0.39 |

EXAMPLE II

A coaxial catheter prepared from low density polyethylene as the outer tube and a reinforced poly(dimethyl siloxane) (silicone rubber) inner tube was treated according to the process of the invention. The outer surface of the inner tube was treated by being placed in the apparatus described in Example I. The chamber was evacuated and back filled with helium to a pressure of 200 microns of mercury. The power delivered to the plasma was 15 watts over a period of 120 seconds.

When the assembled catheter was put in operation with saline solution being injected between the two tubes, the catheter functioned very efficiently and demonstrated good movement of the inner tube over the surface of the outer tube.

The frictional characteristics of the treated polymers in water tested against an untreated polymer showed significant improvement. For example, the friction characteristics of the treated silicone rubber surface when tested in water against an untreated silicone rubber surface were decreased by a factor of approximately two over the silicone rubber control (untreated) against untreated silicone rubber surfaces. However, when both surfaces were surface treated, that is the friction characteristics of a treated silicone rubber were measured against another treated silicone rubber, the value was reduced by a factor of the order of 5–10.

A test in the presence of water was conducted by pulling the inner treated catheter through the outer catheter while both were wrapped around a 2" diameter spool. This 2" diameter spool allows for a consistent tension around the loop. All tests were performed on an 11" segment of inner and outer catheter. The following were the force requirements required to pull the inner catheter through the outer catheter in dry air and in water:

| Conditions of Inner Catheter | |
|---|---|
| Dry | Wet (2 × Distilled Water |
| untreated less than .02 Kg | untreated would not pull through-inner catheter would break |
| RFGD treated less than .02 Kg | RFGD treated .1 Kg force required |

The treatment clearly decreases the friction properties in the wet state but does not significantly affect friction in the dry state.

We claim as our invention:

1. In a process wherein a hydrophobic polymer in contact with a layer of a non-polar liquid moves over the said non-polar liquid while it lays on another solid surface, the improvement for reducing the friction reresistance accompanying such movement which comprises using as the hydrophobic polymer a hydrophobic polymer which has been, at least on the surface in contact with the non-polar liquid, subjected to an oxidation treatment so as to reduce the air-water contact angle of the surface below 50°.

2. A process as in claim 1 wherein the oxidation treatment is accomplished by exposure of the surface to radio frequency glow discharge in an inert atmosphere.

3. A process as in claim 1 wherein the oxidation treatment is accomplished by exposing the surface of the polymer to radio frequency glow discharge in an inert atmosphere to activate the surface and then expose the treated surface to air, so as to effect oxidation and reduce the contact angle to between 0° and 50° and permit the polymer surface in contact with the non-polar liquid to bind a thin film of the liquid thereto.

4. A process as in claim 3 wherein the inert gas is helium, neon, argon or mixtures thereof.

5. A process as in claim 3 wherein the inert gas is mixed with a reactive gas.

6. A process as in claim 5 wherein the reactive gas is oxygen, air water vapor or mixtures thereof.

7. A process as in claim 3 wherein the treatment with the radio frequency discharge is from 0.1 to 10,000 seconds at a power level of 0.1 watts to 1000 watts.

8. A process as in claim 3 wherein the polymer is polyethylene.

9. A process as in claim 3 wherein the polymer is a silicon rubber.

10. A process as in claim 3 wherein the polymer is a fluorinated ethylene-propylene polymer.

11. A process as in claim 3 wherein the polymer is poly(vinyl chloride).

12. A process as in claim 3 wherein the polymer is polystyrene.

* * * * *